(12) United States Patent
Hall et al.

(10) Patent No.: US 7,296,412 B2
(45) Date of Patent: Nov. 20, 2007

(54) NITROGEN PURGE FOR COMBUSTION TURBINE LIQUID FUEL SYSTEM

(75) Inventors: Gavin M. Hall, Atlanta, GA (US);
Julio E. Mestroni, Marietta, GA (US)

(73) Assignee: General Electric Company, Schenectady, NY (US)

( * ) Notice: Subject to any disclaimer, the term of this patent is extended or adjusted under 35 U.S.C. 154(b) by 779 days.

(21) Appl. No.: 10/707,653

(22) Filed: Dec. 30, 2003

(65) Prior Publication Data
US 2005/0144958 A1 Jul. 7, 2005

(51) Int. Cl.
*F02C 7/22* (2006.01)
(52) U.S. Cl. .................... 60/772; 60/39.094; 60/39.469
(58) Field of Classification Search ............. 60/39.094, 60/39.463, 39.465, 772, 776, 784
See application file for complete search history.

(56) References Cited

U.S. PATENT DOCUMENTS

| 3,541,788 | A | * | 11/1970 | Schutz | ..................... | 60/39.094 |
| 4,032,091 | A | * | 6/1977 | Reddy | ..................... | 60/39.094 |
| 6,256,975 | B1 | * | 7/2001 | Dobbeling et al. | ...... | 60/39.094 |

* cited by examiner

*Primary Examiner*—L. J. Casaregola
(74) *Attorney, Agent, or Firm*—Sutherland Asbill & Brennan LLP

(57) ABSTRACT

Method for preventing coking of liquid hydrocarbon fuel in a liquid fuel supply system of a gaseous fuel/liquid fuel combustion turbine comprises injecting nitrogen gas into the liquid fuel supply system to displace a portion of the liquid hydrocarbon fuel adjacent the combustion turbine and separate remaining liquid hydrocarbon fuel in the liquid fuel supply system from the combustion turbine.

19 Claims, 1 Drawing Sheet

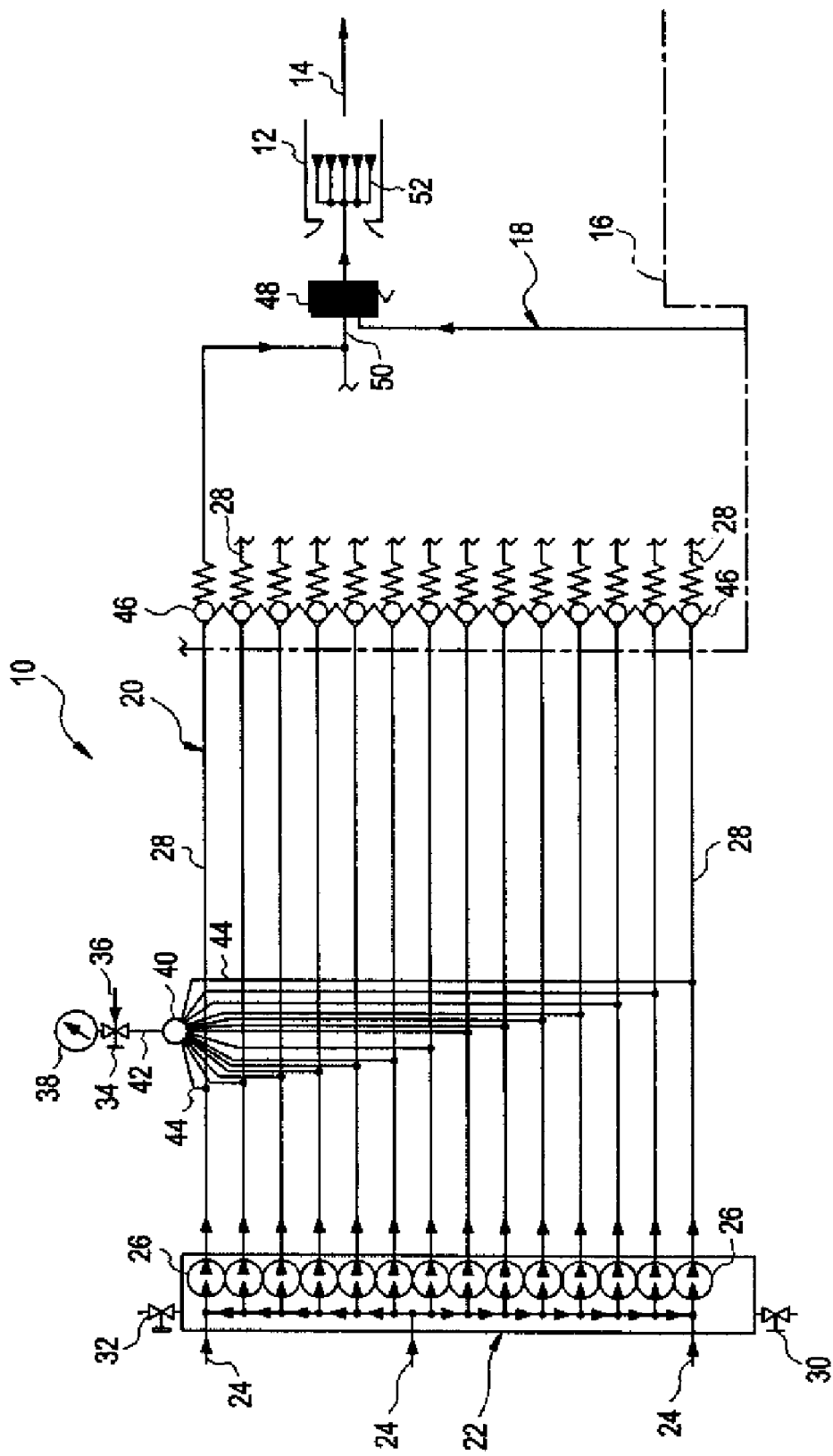

NITROGEN PURGE FOR COMBUSTION TURBINE LIQUID FUEL SYSTEM

BACKGROUND OF INVENTION

This invention relates to combustion turbines powered by both gaseous and liquid hydrocarbon fuels. In particular, this invention relates to a method for preventing coking of liquid hydrocarbon fuel in a liquid fuel supply system of a gaseous fuel/liquid fuel combustion turbine.

Combustion turbines, such as those used for generating electric power, are often fueled by gaseous hydrocarbon fuel, but have access to an alternative liquid hydrocarbon fuel for use when the gaseous fuel is not available or is undesirable. While the combustion turbine operates with gaseous fuel, an adjacent liquid fuel supply system connected to a fuel distributor in the combustion turbine stores the liquid fuel in standby mode.

The liquid fuel supply system includes an arrangement of pipes and valves and is filled with liquid fuel for use when necessary or desired. Combustion of the gaseous fuel during operation of the combustion turbine produces high temperatures in the combustion chamber of the furnace and in the area adjacent the combustion chamber including the area occupied by the liquid fuel supply system. The liquid fuel supply system is filled with liquid hydrocarbon fuel, but also includes some oxygen and air trapped in the liquid fuel system. The combination of liquid hydrocarbon fuel, oxygen, and high temperatures in the liquid fuel supply system adjacent the combustion chamber of the turbine causes oxidation and partial decomposition of the liquid fuel in the liquid fuel supply system and produces coke in the liquid fuel supply system. This process is referred to as "coking" and the coke forms hard deposits in the liquid fuel supply system and clogs and fouls the associated valves and valve screens. Excessive coking and clogging interferes with effective liquid fuel transfer through the liquid fuel supply system and can require the combustion turbine to be shut down for cleaning of the liquid fuel supply system or replacement of its components.

This problem of coking has been addressed by frequently transferring liquid fuel from the liquid fuel supply system to exercise the system components and burn stagnant fuel. This, however, causes operational and financial problems by requiring weekly burning of stagnant liquid fuel, when operation of the combustion turbine with gaseous fuel is normally more economical and desirable.

Another proposed solution is to recirculate liquid hydrocarbon fuel in the liquid fuel supply system, rather than transfer the fuel entirely. This option, however, is complex and expensive and therefore undesirable.

Accordingly, there is a need for a simple and economically desirable method for alleviating coking in the liquid fuel supply system of a combustion turbine.

SUMMARY OF INVENTION

This invention addresses the above described need by providing a method for preventing coking of liquid hydrocarbon fuel in a liquid fuel supply system of a gaseous fuel/liquid fuel combustion turbine comprising injecting nitrogen gas into the liquid fuel supply system in an amount so that the nitrogen gas displaces a portion of the liquid hydrocarbon fuel adjacent the combustion turbine and separates remaining liquid hydrocarbon fuel in the liquid fuel supply system from the combustion turbine. By separating the liquid hydrocarbon fuel in the liquid fuel supply system from the combustion turbine, the nitrogen gas maintains the liquid hydrocarbon fuel at an area of lower temperature than that adjacent the combustion turbine and, unlike oxygen, nitrogen is inert and does not react with the liquid hydrocarbon fuel to create coke. Thus, the combination of physical separation of liquid fuel by the nitrogen gas and displacement of oxygen in the liquid fuel supply system with nitrogen adjacent the combustion turbine alleviates formation of coke in the liquid fuel supply system.

In a preferred embodiment, the combustion turbine comprises at least one combustion chamber and the liquid fuel supply system includes at least one nozzle for delivering the liquid hydrocarbon fuel to the at least one combustion cylinder of the combustion turbine and a valve adjacent the at least one nozzle. The step of injecting nitrogen gas includes displacing the portion of the liquid hydrocarbon fuel through the valve and the at least one nozzle and into the at least one combustion chamber.

Other objects, features, and advantages of this invention will be apparent from the following detailed description, drawing, and claims.

BRIEF DESCRIPTION OF DRAWINGS

FIG. 1 is a schematic illustration of a gaseous fuel/liquid fuel combustion turbine and a liquid fuel supply system with a nitrogen purge in accordance with an embodiment of this invention.

DETAILED DESCRIPTION

As summarized above, this invention encompasses a method for preventing coking of liquid hydrocarbon fuel in a liquid fuel supply system of a gaseous fuel/liquid fuel combustion turbine. A gaseous fuel/liquid fuel combustion turbine 10 in accordance with an embodiment of this invention is illustrated schematically in FIG. 1 and generally comprises a combustion chamber 12 for producing hot combustion gas 14 that turns a rotor (not shown), a turbine enclosure 16 housing the combustion chamber and rotor, a gaseous fuel supply system 18 for supplying the primary fuel to the combustion chamber, and a liquid fuel supply system 20 for supplying an alternative liquid hydrocarbon fuel to the combustion chamber for periods when the gaseous hydrocarbon fuel is undesirable or unavailable.

The liquid fuel supply system 20 includes a liquid fuel flow divider 22 that receives liquid hydrocarbon fuel through a plurality of liquid fuel inlets 24. A plurality of valves 26 in the liquid flow divider 22 direct the liquid hydrocarbon fuel through a corresponding plurality of liquid fuel lines 28.

The liquid fuel flow divider 22 also includes a drain valve 30 for draining fuel from the liquid fuel flow divider and an air vent 32 at the top of the liquid fuel flow divider for venting the flow divider.

The liquid fuel supply system 20 also includes a nitrogen inlet valve 34. The nitrogen inlet valve 34 connects a nitrogen inlet 36 and a pressure gauge 38 to a selector valve 40 via line 42. The selector valve 40 is connected to a plurality of nitrogen feed lines 44 connected respectively to the plurality of liquid fuel lines 28.

Downstream of the nitrogen supply lines 44, the liquid fuel supply lines 28 connect to respective check valves 46 and then continued to a fuel distributor valve 48. The fuel distributor valve 48 feeds the liquid hydrocarbon fuel to a plurality of nozzles 52 disposed in the combustion chamber 12. The gaseous fuel supply system 18 feeds the gaseous hydrocarbon fuel to the nozzles 52.

Although the foregoing combustion turbine 10 is illustrated with only one combustion chamber 12, it should be understood that the combustion turbine can include a plurality of combustion chambers.

In normal operation, the combustion chamber 10 operates with gaseous hydrocarbon fuel supplied through the gaseous fuel supply system 18 and combusted in the combustion chamber 12. Liquid hydrocarbon fuel waits on standby in the liquid fuel supply system 20. To prevent coking, nitrogen gas is introduced through the nitrogen inlet 36 via the inlet valve 34.

Prior to introducing nitrogen gas into the liquid fuel supply system 20, the combustion turbine is desirably stopped and cooled to a temperature at least below about 300° F. Fire protection systems, such as a carbon dioxide quenching system, should be disabled prior to introducing the nitrogen gas to alleviate risk of suffocation by the operator. Also, fuel-forwarding pumps that would otherwise automatically switch the combustion turbine 10 to liquid hydrocarbon fuel supply is disabled during the nitrogen purge.

Liquid fuel is drained from the liquid fuel flow divider 22 and thereafter, a source of pressurized nitrogen is connected to the nitrogen inlet 36. The nitrogen valve 34 is opened allowing nitrogen gas to flow through the selector valve 40 to a first of the plurality of nitrogen supply lines 44.

The nitrogen is supplied at a pressure sufficient to displace at least a portion of the liquid hydrocarbon fuel in the liquid fuel supply line 28 44 through the corresponding check valve 46 and then through the distributor valve 48 and the nozzle 52 into the combustion chamber.

The flow of nitrogen gas is then stopped by closing the nitrogen gas inlet valve 34 or switching the selector valve 40 to supply nitrogen gas to another liquid fuel line 28. Once the pressure is removed, the check valve 46 closes off the downstream components namely the distributor valve 48 and the fuel nozzles 52. The nitrogen gas injected in the liquid fuel supply system then occupies the fuel line 28 and the respective check valve 46. The displaced liquid hydrocarbon fuel can be drained out of a false start drain arrangement (not shown) at the end of the combustion chamber 12. Each of the liquid fuel supply lines 28 is purged in the same manner by selecting the corresponding nitrogen supply line 44 with the selector valve 40 to displace liquid hydrocarbon fuel in the liquid fuel supply lines 28 adjacent the combustion chamber 12.

The nitrogen gas is supplied to the liquid fuel supply system 20 typically at a pressure of at least 120 psig and desirably within a range of at least about 120 psig of up to about 250 psig. In any event, the pressure of a nitrogen gas should be sufficient to force at least a portion of the liquid hydrocarbon fuel through the liquid fuel supply system 20 and into the combustion chamber 12 through the nozzles 52.

The nitrogen gas purge is conducted until a sufficient amount of liquid hydrocarbon fuel is displaced adjacent the combustion chamber 12 to separate the liquid hydrocarbon fuel from the combustion chamber enough to protect the liquid hydrocarbon fuel from high temperature and coking. The amount of time hydrogen gas is injected into the liquid fuel supply system 20 varies depending on the pressure of the nitrogen gas and other parameters of the system, but in the described embodiment, nitrogen gas is desirably injected for at least three minutes and desirably three to five minutes. In this embodiment, sufficient nitrogen gas is injected into the liquid fuel supply system sufficient to displace at least about 15% of liquid hydrocarbon fuel in the liquid fuel supply system, and desirably at least about 20% of the liquid hydrocarbon fuel in the liquid fuel supply system.

After injecting nitrogen gas into the liquid fuel supply system 20, the nitrogen gas is sealed in the liquid fuel supply system upstream of the distributor valve. In addition, the liquid fuel flow divider 22 is filled with a vapor space inhibiting oil through the vent 32. Thereafter, operation of the combustion turbine 10 with gaseous fuel may resume while nitrogen in the liquid fuel supply system prevents coking in the liquid fuel supply system.

It should be understood that the foregoing relates to particular embodiments of the present invention, and that numerous changes may be made therin without departing from the scope of the invention as defined from the following claims.

The invention claimed is:

1. Method for preventing coking of liquid hydrocarbon fuel in a liquid fuel supply system of a gaseous fuel/liquid fuel combustion turbine comprising:
   injecting nitrogen gas into the liquid fuel supply system in an amount so that the nitrogen gas displaces a portion of the liquid hydrocarbon fuel adjacent the combustion turbine and separates a remaining portion of liquid hydrocarbon fuel in the liquid fuel supply system from the combustion turbine; and
   sealing the nitrogen gas in the liquid fuel supply system while the combustion turbine combusts gaseous fuel.

2. Method as in claim 1 wherein the combustion turbine comprises at least one combustion chamber and the liquid fuel supply system includes at least one nozzle for delivering the liquid hydrocarbon fuel to the at least one combustion chamber of the combustion turbine and a valve adjacent the at least one nozzle, and the step of injecting nitrogen gas includes displacing the portion of the liquid hydrocarbon fuel though the valve and the at least one nozzle and into the at least one combustion chamber.

3. Method as in claim 1 wherein the step of injecting nitrogen gas comprises injecting the nitrogen gas at a pressure of at least about 120 psig.

4. Method as in claim 1 wherein the step of injecting nitrogen gas comprises injecting the nitrogen gas at a pressure of at least about 120 psig up to about 250 psig.

5. Method as in claim 3 wherein the step of injecting nitrogen gas comprises injecting the nitrogen gas for at least about 3 minutes.

6. Method as in claim 1 wherein the step of injecting nitrogen gas comprises displacing at least about 15% of The liquid hydrocarbon fuel in the liquid fuel supply system.

7. Method as in claim 1 wherein the step of injecting nitrogen gas comprises injecting the nitrogen gas through an existing valve in the liquid fuel supply system.

8. Method as in claim 1 further comprising stopping and cooling the combustion turbine before the step of injecting nitrogen gas.

9. Method as in claim 1 wherein the liquid fuel supply system comprises a liquid fuel flow divider and the method further comprises draining the liquid fuel flow divider before the step of injecting nitrogen gas.

10. Method for preventing coking of liquid hydrocarbon fuel in a liquid fuel supply system of a gaseous fuel/liquid fuel combustion turbine, the combustion turbine comprising at least one combustion chamber and the liquid fuel supply system including at least one nozzle for delivering the liquid hydrocarbon fuel to the at least one combustion chamber of the combustion turbine and a valve adjacent the at least one nozzle, the method comprising the steps of:

injecting nitrogen gas into the liquid fuel supply system in an amount so that the nitrogen gas displaces through the valve and the at least one nozzle and into the at least one combustion chamber a portion of the liquid hydrocarbon fuel adjacent the combustion turbine and separates remaining liquid hydrocarbon fuel in the liquid fuel supply system from the combustion turbine;

closing the valve to seal the nitrogen gas in the liquid fuel supply system while the combustion turbine combusts gaseous fuel.

11. Method as in claim 10 further comprising stopping and cooling the combustion turbine before the step of injecting nitrogen gas and after the step of injecting nitrogen gas, sealing the nitrogen gas in the liquid fuel supply system, and thereafter combusting gaseous fuel in the combustion turbine.

12. Method as in claim 10 wherein the liquid fuel supply system comprises a liquid fuel flow divider and the method further comprises draining the liquid fuel flow divider before the step of injecting nitrogen gas.

13. Method as in claim 10 wherein the step of injecting nitrogen gas comprises injecting the nitrogen gas at a pressure of at least about 120 psig.

14. Method as in claim 10 wherein the step of injecting nitrogen gas comprises displacing at least about 15% of the liquid hydrocarbon fuel in the liquid fuel supply system.

15. Method as in claim 10 wherein the step of injecting nitrogen gas comprises injecting the nitrogen gas at a pressure of at least about 120 psig up to about 250 psig.

16. Method for preventing coking of liquid hydrocarbon fuel in a liquid fuel supply system of a gaseous fuel/liquid fuel combustion turbine comprising the steps of:

stopping combustion in the combustion turbine;

cooling the combustion turbine;

thereafter injecting nitrogen gas into the liquid fuel supply system in an amount so that the nitrogen gas displaces a portion of the liquid hydrocarbon fuel adjacent the combustion turbine and separates remaining liquid hydrocarbon fuel in the liquid fuel supply system from the combustion turbine;

sealing the nitrogen gas in the liquid fuel supply system; and thereafter combusting gaseous fuel in the combustion turbine while maintaining the nitrogen gas in the liquid fuel supply system adjacent the combustion turbine.

17. Method as in claim 16 wherein the step of injecting nitrogen gas comprises injecting the nitrogen gas at a pressure of at least about 120 psig.

18. Method as in claim 16 wherein the step of injecting nitrogen gas comprises displacing at least about 15% of the liquid hydrocarbon fuel in the liquid fuel supply system.

19. Method as in claim 16 wherein the step of injecting nitrogen gas comprises injecting the nitrogen gas at a pressure of at least about 120 psig up to about 250 psig.

* * * * *